United States Patent
Coleman et al.

(10) Patent No.: US 7,875,303 B2
(45) Date of Patent: Jan. 25, 2011

(54) PROTEIN SYSTEM AND FOOD PRODUCTS INCLUDING SAME

(75) Inventors: Edward C. Coleman, New Fairfield, CT (US); Gregory A. May, Park Ridge, NJ (US)

(73) Assignee: Kraft Foods Global Brands LLC, Northfield, IL (US)

( * ) Notice: Subject to any disclaimer, the term of this patent is extended or adjusted under 35 U.S.C. 154(b) by 694 days.

(21) Appl. No.: 11/278,210

(22) Filed: Mar. 31, 2006

(65) Prior Publication Data

US 2007/0231450 A1    Oct. 4, 2007

(51) Int. Cl.
     A23L 1/20    (2006.01)
(52) U.S. Cl. .................. 426/72; 92/634; 92/656
(58) Field of Classification Search ............ 426/72, 426/92, 634, 656
     See application file for complete search history.

(56) References Cited

U.S. PATENT DOCUMENTS

| | | | |
|---|---|---|---|
| 3,821,443 A | 6/1974 | Halladay et al. | |
| 3,987,206 A | 10/1976 | Titcomb et al. | |
| 4,018,901 A | 4/1977 | Hayward et al. | |
| 4,039,688 A | 8/1977 | Hayward et al. | |
| 4,152,462 A | 5/1979 | Hayward et al. | |
| 4,415,596 A | 11/1983 | Andersen et al. | |
| 4,451,488 A | 5/1984 | Cook et al. | |
| 5,039,532 A | 8/1991 | Jost et al. | |
| 5,077,062 A | 12/1991 | Ernster | |
| 5,405,637 A | 4/1995 | Martinez et al. | |
| 5,589,357 A * | 12/1996 | Martinez et al. | 435/68.1 |
| 5,780,439 A * | 7/1998 | Mendy et al. | 514/21 |
| 6,432,457 B1 | 8/2002 | Jones | |
| 6,479,083 B1 | 11/2002 | Han et al. | |
| 6,537,597 B1 * | 3/2003 | Nakamori et al. | 426/46 |
| 6,592,915 B1 | 7/2003 | Froseth et al. | |
| 6,607,760 B2 | 8/2003 | Burri et al. | |
| 6,777,017 B2 * | 8/2004 | Porter et al. | 426/590 |
| 6,784,209 B1 * | 8/2004 | Gardiner et al. | 514/565 |
| 6,790,466 B1 | 9/2004 | Rabault et al. | |
| D498,897 S | 11/2004 | Milker et al. | |
| 6,919,314 B1 | 7/2005 | Schlothauer et al. | |
| 2002/0051835 A1 | 5/2002 | Jones | |
| 2002/0102330 A1 * | 8/2002 | Schramm et al. | 426/72 |
| 2003/0161914 A1 * | 8/2003 | Sault et al. | 426/103 |
| 2003/0170347 A1 * | 9/2003 | McCabe | 426/89 |
| 2003/0170348 A1 * | 9/2003 | Mihalos et al. | 426/93 |
| 2003/0215559 A1 | 11/2003 | Mikaelian et al. | |

(Continued)

FOREIGN PATENT DOCUMENTS

EP    1164870 B1    5/2004

(Continued)

*Primary Examiner*—Anthony Weier
(74) *Attorney, Agent, or Firm*—Fitch, Even, Tabin & Flannery

(57) ABSTRACT

A protein system for food products containing a moisture source is provided having a combination of intact proteins, casein, and partially hydrolyzed dairy protein and partially hydrolyzed legume protein in a total amount effective to reduce mixing time and/or shear requirements, and reduce firmness development during processing and storage of the food products to increase shelf life. The reduced firmness is achieved without embittering the food product by using a protein blend delivering a unique balance of partially hydrolyzed and intact proteins, and casein. Methods of making the food products with the protein blends are also covered.

22 Claims, 3 Drawing Sheets

U.S. PATENT DOCUMENTS

| | | |
|---|---|---|
| 2004/0086600 A1* | 5/2004 | Rapp et al. .................... 426/72 |
| 2004/0156969 A1* | 8/2004 | Paulsen et al. .............. 426/580 |
| 2004/0166202 A1* | 8/2004 | Prosise et al. ................. 426/72 |
| 2004/0166203 A1* | 8/2004 | Gautam et al. ................ 426/74 |
| 2004/0219280 A1 | 11/2004 | Green |
| 2005/0053695 A1 | 3/2005 | Coleman et al. |
| 2006/0115554 A1* | 6/2006 | Gautam et al. ................ 426/72 |
| 2007/0087084 A1* | 4/2007 | Coleman et al. .............. 426/89 |
| 2007/0148324 A1* | 6/2007 | Lin et al. .................... 426/656 |

FOREIGN PATENT DOCUMENTS

| | | |
|---|---|---|
| EP | 1 488 704 A1 | 12/2004 |
| EP | 1 527 696 A1 | 5/2005 |

* cited by examiner

PROTEIN SYSTEM AND FOOD PRODUCTS INCLUDING SAME

BACKGROUND OF THE INVENTION

This invention relates to an improved protein system for food products, and food products such as food bars incorporating such a protein system.

FIELD OF THE INVENTION

High protein snack bars have been made with a protein powder component held together with binder comprising one or more of carbohydrate syrup, sugar alcohol, and so forth. In a triple layer configuration, these high protein bars have included a dense, low-porosity protein powder core, a caramel layer, and a compound coating which enrobes them. A blend of nutrients, vitamins and minerals are also often formulated into these bars. During shelf life, the proteinaceous core portion of these conventional high protein snack bars tend to harden and become firm, and no longer are soft, moist and chewy as desired. This hardening degrades the bar texture and flavor, which shortens the product's useful shelf life. Inclusion of gelatin in the food bar formula is thought to mitigate the problem. However, gelatin generally is not considered a high quality protein source. Protein quality usually is assessed by two major factors: how well the protein satisfies amino-acid requirements and the digestibility of the protein. A high-quality protein contains the essential amino acids in adequate amounts, and is digestible and absorbed by the body. These two criteria are combined in the Protein Digestibility-Corrected Amino Acid Score (PD-CAAS), which is used in the food industry as a rating system for proteins. Other protein-quality measurement tools include Biological Value and Protein Efficiency Ratio. Alternative improved solutions to the bar core hardening problem are desired.

Hydrolyzed dairy and vegetable proteins have been used in infant formulas and other hypoallergenic food formulations, and also in specialty protein supplements for fitness formulas, medical uses, and so forth. These hydrolyzed proteins, also referred to as protein hydrolysates, are typically prepared by acid or enzymatic hydrolysis of proteins. Hydrolysis generally breaks protein chains into smaller segments including peptides and amino acids. Protein hydrolysates as used previously in food formulations have often been associated with bitter flavor development, which can be a significant drawback to obtaining consumer acceptance.

There is a need for food bars that are more resistant to protein hardening to improve their organoleptic properties and shelf life. As will become apparent from the descriptions that follow, the invention addresses this need as well as providing other advantages and benefits.

SUMMARY OF THE INVENTION

The invention provides protein systems for food products having improved shelf life which maintain a softer and moister texture over time. The protein system is used in food products containing a moisture source, wherein the protein system comprises a combination of intact proteins, casein, and partially hydrolyzed dairy protein and partially hydrolyzed legume protein in a total amount effective to reduce firmness development during processing and shelf life. This reduced firmness is achieved without embittering the food product. Methods of making food products with the dry protein blends are also embodied.

In food products of embodiments of the present invention, dry protein blends including partially hydrolyzed dairy and legume proteins combined with intact forms of these respective proteins and casein are incorporated into a food product effective to improve product texture, shelf life, and processing. The partially hydrolyzed dairy and legume proteins acquire moisture from a moisture source in the food product, such as a binder, such that they hydrate during food processing and shelf life without significantly hardening, especially as compared with intact proteins under similar conditions. It has been discovered that this hardening reduction can be achieved with addition levels of the respective partially hydrolyzed dairy and legume proteins that do not impart or cause unpleasant bitterness or off-flavors in the food product, nor render the mixture to loose to form dough that can be formed into self-supporting matrix structures that remain moist and chewy during storage. In a food product or component comprising a moisture-containing binder system and powdered protein components, the addition of protein blends containing about 1 to about 40 wt % partially hydrolyzed dairy and legume proteins to the food product formulation has been observed to provide this enhanced balance of product properties. The remainder of the protein content desired in or specified for the food product can be composed of intact protein sources. It also has been discovered that mixing times and/or mixing shear needed to provide a substantially uniform mixture of food product or food component ingredients containing proteins are reduced by the presence of the hydrolyzed proteins in proportions set forth herein, as compared to formulations which instead use a comparable amount of intact protein in place of the hydrolyzed protein content. This reduces the amount of shear forces needed to obtain a uniform mixture from the combination of food product ingredients. This also reduces or eliminates hardening of protein content in the mixture that otherwise may occur if longer mixing times and/or more intense mixing conditions are applied. Moreover, proportions of legume and dairy derived proteins may be balanced, such as illustrated in protein blend formulations described herein, to reduce cost via legume protein content while maintaining a desirable overall product flavor via dairy protein content. Therefore, an excellent balance of improved shelf life, flavor, and processing benefits are provided with the proteins blends of the present invention when used in food bar or other food product preparations.

A protein blend of one embodiment of the present invention comprises about 5 wt % to about 30 wt % partially hydrolyzed dairy protein, about 5 wt % to about 15 wt % partially hydrolyzed legume protein, about 20 wt % to about 30 wt % intact dairy protein, about 5 wt % to about 15 wt % intact legume protein, and about 26 wt % to about 36 wt % acid casein or edible salt thereof. In one embodiment, the partially hydrolyzed dairy protein and partially hydrolyzed legume protein each may comprise hydrolysate products having a degree of hydrolysis of about 4 to about 15%, particularly about 6% to about 10%, and more particularly about 7 to about 8%. In another embodiment, the protein blend contains total partially hydrolyzed dairy protein and total non-hydrolyzed intact dairy protein in a ratio of about 22 to about 28, particularly about 23 to about 27, more particularly about 24 to about 26, respectively, and contains total partially hydrolyzed legume protein and total non-hydrolyzed intact legume protein in a ratio of about 22 to about 28, more particularly about 23 to about 27, more particularly about 24 to about 26, respectively. The protein blend may be used in powder forms having a size of minus 10% maximum on #100 U.S. sieve mesh. The protein blend may be used in variety of snack, confectionary and savory food products.

A food bar is provided in one particular embodiment comprises an enrobed core containing the protein blend. The core may comprise a protein-containing component comprising about 1 wt % to about 9 wt % partially hydrolyzed dairy protein, about 0.5 wt % to about 8.5 wt % partially hydrolyzed legume protein, about 0.5 wt % to about 8.5 wt % intact dairy protein, about 55 wt % to about 85 wt % intact legume protein, about 20 wt % to about 30 wt % acid casein or edible salt thereof, and about 20 wt % to about 40 wt % binder material. The binder material may be a carbohydrate binder alone or in combinations with other types of binder materials. The core can be enrobed with a chocolate-containing coating such as a compound coating. The food bar may further comprise a caramel component contacting the protein-containing component, which also is enrobed with the chocolate-containing composition. In another embodiment, the protein blend content is distributed in the core component, which contains a major portion thereof, as well as in a caramel component and/or a compound coating which enrobes the core and caramel components. Also, a minor portion of the compound coating optionally can be included in the core component (e.g., 1-25%) before mixing to further enhance shelf life and improve flavor, as the compound coating is thought to coat proteins as a fat barrier which retards their hydration. The food bar may have a 10 to 70 g discrete shape. Food bars prepared with these protein and binder systems retain good textural properties in standard packaging for many months, such as at least approximately nine months.

As used in food products and protein blends of the present invention, the partially hydrolyzed dairy protein may comprise partially hydrolyzed whey protein and/or partially hydrolyzed milk protein. The partially hydrolyzed legume protein may comprise partially hydrolyzed soy protein. The starting dairy protein which is partially hydrolyzed to form the hydrolysates product, and also the intact dairy protein component of the protein blend, i.e., non-hydrolyzed dairy protein material, may be selected from the group consisting of whey protein concentrate, milk protein concentrate, whey protein isolate, and milk protein isolate. The starting legume protein which is partially hydrolyzed to form the hydrolysate product, and also the intact legume protein of the protein blend, i.e., non-hydrolyzed legume protein material, may be selected from the group consisting of soy protein concentrate and soy protein isolate.

A method for making a food bar is also provided including (a) forming a protein-containing core component comprising (i) mixing ingredients including at least binder, partially hydrolyzed dairy protein, and partially hydrolyzed legume protein to form a dough, wherein the partially hydrolyzed dairy protein and partially hydrolyzed legume protein are added in a total amount effective to reduce mixing time or shear required to blend the ingredients of the protein-containing core component into a substantially uniform mixture relative to an otherwise identical protein-containing component substituting intact forms of the hydrolyzed dairy and legume proteins therefor, (ii) sheeting the dough, and (iii) cooling the sheeted dough to provide a protein-containing core component; and (b) coating, e.g., enrobing, encapsulating, or drizzling, the protein-containing core component with a chocolate-containing coating composition to provide a food bar. In a further embodiment, the method also includes the step of combining the protein-containing core component with a diverse supplemental core component, such as, e.g., a caramel component layer, creamy dairy layer, fruit layer, peanut butter layer, chocolate layer, frosting layer, honey layer, yogurt layer, and/or gelatin layer, etc., to provide an intermediate food structure, and then coating the intermediate food structure with the chocolate-containing coating composition.

DETAILED DESCRIPTION OF THE PREFERRED EMBODIMENTS

Figure 1:
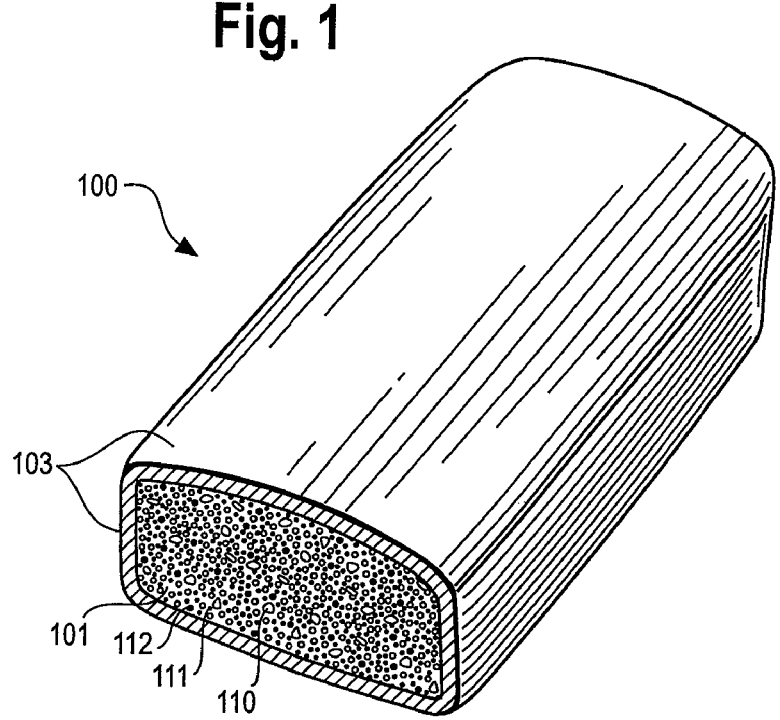
FIG. 1 is a perspective view in partial cross-section of a food bar according to one embodiment of the present invention.

Referring to FIG. 1, a snack food bar 100 is shown in accordance with one embodiment of the present invention. A protein-containing core component 101 is enrobed with a compound coating 103. Core component 101 contains, as a unitary matrix 110, protein blend 111 and a binder system 112. The matrix 110 is a dense, non-porous structure, and includes minimal or no air gaps or interstices. In the core component 101, protein blend constituents are dispersed substantially uniformly throughout the matrix via the binder system. In this illustration, at least one internal moisture source is present within the food bar 100. For instance, the binder system 112 may include moisture content. This moisture content will have a tendency to migrate from the binder system to the protein particles co-present in the protein-containing core component or other components of the food bar.

Figure 2:
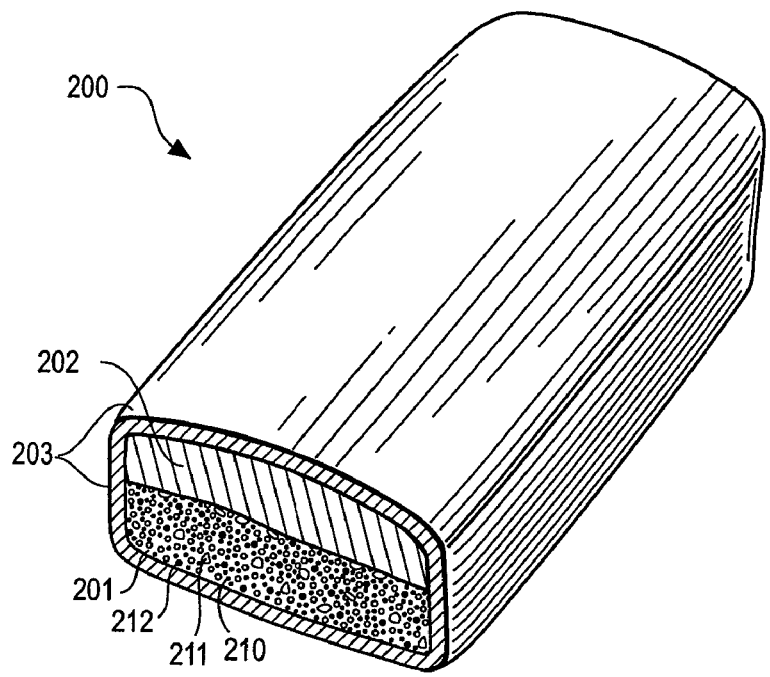
FIG. 2 is a perspective view in partial cross-section of a food bar according to another embodiment of the present invention.

Referring to FIG. 2, a snack food bar 200 is shown in accordance with another embodiment of the present invention. A protein-containing core component 201 is stacked adjacent a caramel component 202 (or other diverse component such as a fruit layer or cream layer), and the resulting combination is enrobed with a compound coating 203. Core component 201 contains, as a unitary matrix 210, a protein blend 211 and a binder system 212. The matrix 210 is a dense, non-porous structure, and includes minimal or no air gaps or interstices. In the core component 201, protein blend constituents are dispersed substantially uniformly throughout the matrix via the binder system. The food bar 200 includes at least one internal moisture source, such as the binder system 212, which has a tendency to migrate from the binder system to the protein particles present in the core component or other components of the food bar.

Although illustrated as a horizontal layered construction in slab form in FIGS. 1 and 2, it also will be appreciated that the concepts of the present invention can be implemented in a wide variety of layering orientations and geometrical shapes and forms which incorporate the above-indicated three components. For convenience, the food bar may be shaped into any form convenient for packaging, handling and grasping. The food product can be eaten out of the package by hand without need for dining utensils. The bar shapes and forms are not necessarily limited and include, for example, slab, cylinder, sphere, and the like. For instance, the core component 101 or 201 is not limited to a sheet construction, nor is the bar 100 or 200 limited to a generally rectangular slab construction, as illustrated in FIGS. 1 and 2. For example, the core component also may be formed in a cylindrical or other non-planar rectilinear geometric shape 300 (FIG. 3), or generally as a sphere-like shape 400 (FIG. 4), which is used as a core component thereof that is optionally encapsulated with the caramel coating, and the resulting intermediate structure is enrobed with compound coating. In this regard, components 301 to 303, 310 to 312 in FIG. 3 and components 401 to 403, 410 to 412 in FIG. 4 correspond respectively to components 201 to 203, 210 to 212 of FIG. 2. It will be appreciated that the sizes and shapes of the components and features shown in FIGS. 1-4 are illustrative only and are not necessarily drawn to exact scale, shape, or geometry. For example, the binder system may predominantly comprise a coating or network that interconnects protein particles and other core ingredients instead of discrete particles as shown in the figures.

For purposes herein, "Hardness" and "firmness" are used interchangeably, and refer to food texture that resists deformation by external force. The amount of "firmness" of a food product or component can be quantitatively determined by a commercial texture analyzer, such as, e.g., a TA-XT2 Texture Analyzer (Stable Micro System Company, Godalming, Surrey UK). The term "intact protein" refers to a protein in its original and undenatured condition. "Hydrolyzed protein" refers to a protein that has been processed through acid or enzymatic hydrolysis in which protein chains are broken down into smaller segments including peptides and amino acids. The hydrolyzed proteins are at least partially hydrolyzed proteins, and can comprise filly hydrolyzed proteins, or combinations or mixtures thereof. "Protein concentrate" generally refers to protein materials containing about 80 up to about 90% protein. A "protein isolate" has a protein content of about 90% or more.

Protein Blend. Dry protein blends incorporating partially hydrolyzed dairy and legume proteins in combination with intact dairy and legume proteins, and casein, are provided, which deliver an improved balance of product texture and flavor, extended shelf life, process enhancements, and cost savings in food products, such as food bars.

Protein nutrition bars in accordance with an embodiment may contain as much as approximately 15 grams of total protein per 50 gram bar. In one embodiment the food bars may contain up to about 0.3 grams total protein per gram of food bar, particularly may contain about 0.01 to about 0.3 grams total protein per gram food bar, and more particularly may contain about 0.1 to about 0.3 grams total protein per gram food bar. The present investigators have observed that high protein bars tend to harden over time due to internal moisture migration problems. For instance, moisture tends to move from a binder syrup system and the like, or other moisture source, to the proteins, forming a hard protein matrix. It has been discovered that hydrolyzed legume and dairy proteins harden less upon hydration than their intact forms in protein/binder matrices in food products, thus yielding a preferred soft, moist and chewy texture during shelf life. This reduced firmness is achieved without embittering the protein-containing component using protein blends formulated in accordance with the present invention.

In a food product or component comprising a moisture-containing binder system (or other comparable moisture source) and powdered protein components, the addition of protein blends containing about 4 to about 16 wt %, particularly about 4 to about 13 wt %, more particularly about 6 to about 10 wt %, partially hydrolyzed dairy and legume proteins to the food product or component formulation has been observed to provide this improved balance of product properties. This proportion of partially hydrolyzed protein content generally provides enhanced product texture and mixing processing without imparting undue bitterness or other off-flavors. The remainder of the protein content desired in or specified for the food product can be composed of intact protein sources. Moreover, proportions of legume and dairy derived proteins may be balanced, such as illustrated in protein blend formulations described herein, to reduce cost via legume protein content while maintaining a desirable overall product flavor via dairy protein content.

In a particular embodiment, the protein blend comprises about 18 wt % to about 28 wt % partially hydrolyzed dairy protein, about 5 wt % to about 15 wt % partially hydrolyzed legume protein, about 20 wt % to about 30 wt % intact dairy protein, about 5 wt % to about 15 wt % intact legume protein, and about 26 wt % to about 36 wt % acid casein or edible salt thereof. In a more particular embodiment, the protein blend comprises about 21 wt % to about 25 wt % partially hydrolyzed dairy protein, about 8 wt % to about 12 wt % partially hydrolyzed legume protein, about 23 wt % to about 27 wt % intact dairy protein, about 8 wt % to about 12 wt % intact legume protein, and about 29 wt % to about 33 wt % acid casein or edible salt thereof. In another embodiment, the protein blend contains total partially hydrolyzed dairy protein and total non-hydrolyzed intact dairy protein in a ratio of about 22 to about 28, particularly about 23 to about 27, more particularly about 24 to about 26, respectively, and contains total partially hydrolyzed legume protein and total non-hydrolyzed intact legume protein in a ratio of about 22 to about 28, more particularly about 23 to about 27, more particularly about 24 to about 26, respectively. In one embodiment, the protein blends may be used in powder forms having a size of minus 10% max on #100 U.S. sieve mesh. In a particular embodiment, the protein blend has a particle size distribution determined via ROTAP sieve shaker, as follows (based on U.S. Standard mesh): on (+) 80 mesh: 12-16%, +100 mesh: 11-15%, +140 mesh: 45-51%, +200 mesh: 14-18%, through (minus) 200 mesh: 7-9%.

As used in food products and protein blends of the present invention, the partially hydrolyzed dairy protein may comprise partially hydrolyzed whey protein, partially hydrolyzed milk protein, and combinations thereof The partially hydrolyzed legume protein may comprise partially hydrolyzed soy bean protein. Partially hydrolyzed proteins from other sources such as wheat, rice, etc., also may be used. The partially hydrolyzed proteins preferably have a degree of hydrolysis between about 2% to about 20%, particularly about 4% to about 10%, more particularly about 7% to about 8%.

Partially hydrolyzed dairy and legume proteins can be commercially obtained or synthesized using conventional methods. Hydrolysis of intact undenatured whey proteins can be performed, e.g., using conventional techniques with proteolytic enzymes used for this purpose, such as trypsin, chymotrypsin, pancreatin, and mixtures of these. For example, the hydrolysis step is carried out using an effective amount of protease enzymes selected for their effectiveness in hydrolyzing the dairy or soy proteins, as applicable, and for the flavor profile provided in the final end product using the partially digested protein. The soy or dairy protein is hydrolyzed for an amount of time and a temperature effective to partially digest the protein without developing adverse flavor characteristics in the partially digested protein material. In one embodiment, the degree of hydrolysis of the partially hydrolyzed dairy protein and partially hydrolyzed legume protein each is about 4 to about 15%, particularly about 6% to about 10%, and more particularly about 7 to about 8%. To determine the degree of hydrolysis of the partially hydrolyzed proteins, the United States Pharmacopeia (USP) formol titration method may be used where the increase in free amino groups during hydrolysis of the peptide bonds can be estimated by titration with sodium hydroxide. The partially digested protein is then heated to a temperature sufficient to inactivate the protease enzymes. This step also may be utilized to inactivate or kill of any bacteria or other microorganism contamination of the protein digest mixture (e.g., a pasteurization step).

A whey starting material containing the whey proteins may be obtained as whey from cheese making, particularly sweet whey such as that resulting from the coagulation of casein by rennet, acidic whey from the coagulation of casein by an acid, or the acidifying ferments, or even mixed whey resulting from coagulation by an acid and by rennet. Whey protein concentrates are typically obtained by ultrafiltration of milk's liquid whey fraction to eliminate lactose, mineral ash and water content and concentrate whey protein in the retentate. Whey protein isolates can be obtained by cross flow microfiltration or ion exchange filtration methods known in the art. Whey protein concentrates and isolates are generally available in powder forms. For hydrolyzing soy material into soy hydrolysates, a protease enzyme may be utilized in a conventional manner. Such proteases are also proteolytic enzymes. The proteases may be, for example, proteases from microbiological origins, such as fungal proteases or bacteriological proteases. Soy protein concentrates generally are produced by removing the oil and most of the soluble sugars from defatted soybean meal, and typically come in the form of a white powder containing about 80-90% protein, plus most of the soybeans vitamins, minerals, and finely pulverized dietary fiber. Soy Protein Isolates, also called isolated soy proteins, are essentially soy protein concentrates minus almost all their dietary fiber. This very bland, white powder contains at least 90% protein. Textured soy protein products also may be used which are made by texturizing concentrates or isolates in known manners.

The intact dairy proteins may be selected from the group consisting of whey protein concentrate, milk protein concentrate, whey protein isolate, and milk protein isolate. Milk protein concentrates generally include the ingredients produced from skim milk including the casein and whey proteins, some fat, minerals, vitamins and less lactose than nonfat dry milk. Milk protein isolates are a co-precipitate of casein and whey proteins that typically range from about 90-95%, or higher, total protein content. The intact legume protein may be selected from the group consisting of soy protein concentrate and soy protein isolate. The legume protein, intact or partially hydrolyzed forms, also can be derived from a variety of other leguminous sources, such as peanuts, green peas, chick-peas, kidney beans, lupins, and so forth, and combinations thereof. The partially hydrolyzed and intact protein sources preferably are concentrates or isolates containing at least 80% protein per gram. Commercial sources of intact and partially hydrolyzed soy proteins may be obtained from, e.g., Cargill, Solae, and ADM. Commercial sources of intact and partially hydrolyzed dairy proteins may be obtained from, e.g., Davisco, Glanbia, Fonterra, and Europro.

Acid casein and/or caseinates are included in the protein blend in an amount sufficient to deliver protein and build core structure. The acid casein ingredient can be commercially obtained or made by conventional processes. Acid casein may be obtained by addition of acid or microbial cultures to skim milk, reducing the pH to 4.6, so that the casein is precipitated from the whey. As known, acid casein can be resolubilized by the addition of alkali or alkaline salt to form caseinates, such as sodium caseinates, calcium caseinates, and so forth, which also can be used, depending on the characteristics needed. Lactic casein and rennet casein also may be used. Lactic casein is obtained adding microbial cultures to milk, converting the lactose to lactic acid and thus lowering the pH. Rennet casein is made by use of rennet to precipitate the casein, resulting in a high-calcium protein fraction.

A specific non-limiting illustration of a protein blend for use in food products, such as food bars, includes the following: about 9.5-11.5% soy protein isolate, about 9.5-11.5% partially hydrolyzed soy protein isolate, about 22.5-24.5% part, partially hydrolyzed milk protein isolate, about 24.2-25.3% whey protein isolate, and about 30.5-31.5% acid casein. Other non-limiting examples of specific protein systems/blends for use in food bars include the following: System 1: 26% partially hydrolyzed soy protein isolate, 34% whey protein isolate, 40% acid casein; System 2: 22% partially hydrolyzed soy protein isolate, 20% partially hydrolyzed whey protein isolate, 15% calcium caseinate, 18% whey protein isolate, 25% acid casein; System 3: 20% partially hydrolyzed soy protein isolate, 22% partially hydrolyzed whey protein isolate, 28% whey protein isolate, and 30% acid casein.

Figure 3:
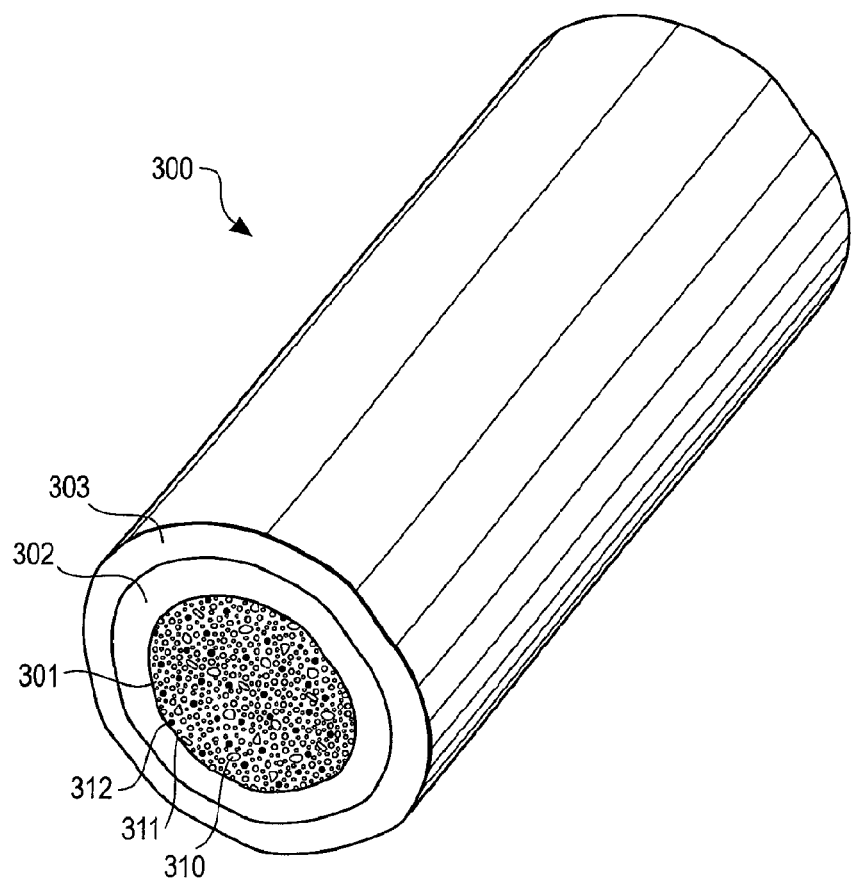
FIG. 3 is a perspective view in partial cross-section of a food bar according to another embodiment of the present invention.
Figure 4:
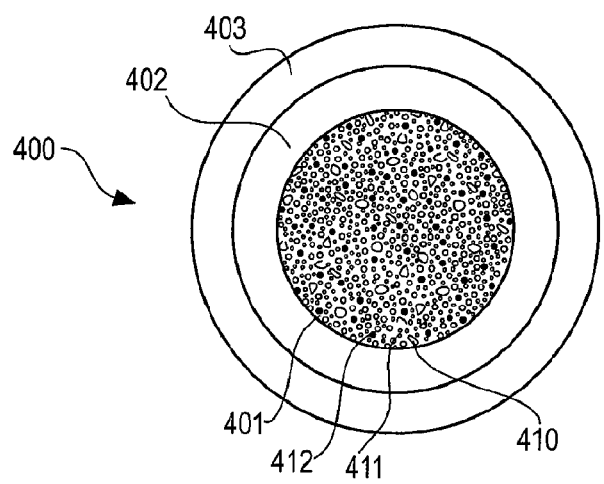
FIG. 4 is a cross-sectional view of a snack product according to another embodiment of the present invention.

These protein blends can be used in one or more different layers of a food bar including, e.g., the core, caramel, and/or chocolate coating of food bars such as illustrated in FIGS. 1-3. These protein blends provide texture and resist firming and drying-out versus a non-hydrolyzed system. Food bars assembled with these protein and binder systems retain good textural properties in standard packaging for many months, such as at least approximately nine months. These modified food products have been rated as superior by tasters during organoleptic shelf life evaluations than products which contained no hydrolyzed protein. The protein blend may be used in variety of snack, confectionary and savory food products.

In one embodiment, the protein system is a dry blend which is combined with a binder system to yield dough. The core dough matrix generally is balanced to deliver a water activity (Aw) in the 0.40 to 0.60 range. The dough can be sheeted out using conventional bar making equipment, or extruded or otherwise processed in any suitable manner. Minimal mixing with liquids is preferred during processing. As indicated, to enhance the effect of improving texture and extending shelf life while minimizing bitterness, the blend should contain about 5% to about 15% total partially hydrolyzed protein.

It also has been discovered that mixing times and/or mixing shear needed to provide a substantially uniform mixture of food product or food component ingredients containing sugar syrups (or other carbohydrate binders) and proteins are reduced by the presence of the partially hydrolyzed proteins in proportions set forth herein, as compared to formulations which instead use a comparable amount of intact protein in place of the partially hydrolyzed protein content. The partially hydrolyzed protein, when used in an effective amount, hydrates the core dough quickly and allows use of shorter mix times, such as approximately 50% or more reductions in mixing time. This reduces the amount of shear forces needed to obtain a uniform mixture from the combination of food product ingredients. This also reduces or eliminates hardening of protein content in the mixture that otherwise may occur if longer mixing times and/or more intense mixing conditions are applied. For instance, mixing times for binder/protein blend core formulations for triple layer bars can be reduced from about 4-5 minutes to about 2 minutes using protein blends of the present invention. Care should be taken not to over load the food component formulation with undue amounts of partially hydrolyzed proteins to the extent that the formulation mixes too rapidly into a loose, soupy consistency which is not suited for dough matrix formation.

Binder System. The binder system used to consolidate a food component containing a protein blend in accordance with embodiments herein may be composed exclusively of binder material(s) or may be binder(s) combined with non-binding ingredients. The term "binder," when used without qualification herein generally refers to an edible binding composition that can be conveniently rendered flowable via heating, and reverts to non-flowable condition upon cooling, that essentially acts as "glue" for combining the dries.

Enough binder should be used such that protein powders and any other dries can be interconnected and bound together as a unitary structure by the binder. The binder system preferably comprises a carbohydrate-based binder. The carbohydrate-based binder may comprise a carbohydrate syrup composition, such as, for example, one or more of corn syrup, high fructose corn syrup, rice syrup, liquid sucrose, molasses, honey, combinations thereof and the like. Sugar syrups are particularly useful. In one embodiment, about 16 wt. % to about 36 wt. % of the total weight of the core component of the bar, may be made up of carbohydrate based syrup as the primary or essentially sole binder material. The binder system also may include fats and/or oils, such as vegetable oils, suitable for this purpose. Other binding materials may include sugar alcohols, gelatin, hydrolyzed collagen, fiber (e.g., polydextrose), egg solids, and the like and combinations thereof. Farinaceous powders, such as dry starch powders, also may be used at least in part as the binder material. Farinaceous powders, such as dry starch powders, also may be used at least in part as the binder material. The syrup composition also may be a gelatin matrix comprised of gelatin, water, fat, syrup and sugars. When mixed with other ingredients, such as soy products, the binder can also be a source of protein. Polyhydric alcohols, i.e., sugar alcohols, also may be included in the binder system. Sugar alcohols include, e.g., glycerin, maltitol, sorbitol, erythritol, and xylitol, and the like and combinations thereof). Sugar alcohols also may be used as sugar-free sweeteners and/or humectants. The syrup composition also may be a gelatin matrix comprised of gelatin, water, fat, syrup and sugars. When mixed with other ingredients, such as soy products, the binder can also be a source of protein.

In order to render the binder system flowable, it may be pre-heated, preferably before combination with the protein blend or system to a temperature suitable to render the binder flowable. Once the binder is combined with the protein system, the combination may be blended together to disperse the binder and the dries and other ingredients to form a substantially uniform mixture. The resulting mixture is then subsequently formed or shaped into a desired shape and/or combined with other bar components.

The binder preferably has a low enough viscosity such that it mixes in with and readily coats the protein powders or other dries. The water content of the binder is generally from about 1% to about 60%, particularly from about 5% to 40%, and more particularly from about 10% to 20%.

A binder can also be used as a medium for admixture and a carrier for distributing additives throughout the core component matrix such as the high fiber caramel composition and any compound coating added thereto, as well as liquid-soluble or liquid-dispersible food bar additives such as vitamins, minerals and macronutrients, flavorings and colorings, and so forth.

Compound Coating. The compound coating typically comprises a fat source. In a particular embodiment, the compound coating comprises chocolate or milk chocolate. One or more flavorings, such as peanut butter, vanilla, milk, and chocolate flavorings, and so forth and combinations thereof, also are usually included in the compound coating, although not required. The compound coating is applied to exposed surfaces of a core structure, which may be a protein-containing core component alone or a multi-layered assembly incorporating it, in a manner useful to completely or partially enrobe, encapsulate, cover and so forth, the core structure. A multi-layered core assembly may comprise, e.g., a stacked assembly of a protein-containing core component and one or more diverse supplemental core component(s) such as a caramel layer, creamy dairy layer, fruit layer, etc. The compound coating can be a chocolate-containing composition that can be made flowable with application of heat to provide a coating composition which solidifies at room temperature or a chilled temperature. The compound coating may be applied by immersing a core structure including the protein-containing core into a heated bath of the compound coating, and then cooling the coated structure sufficient to solidify the compound coating in place on the core structure.

A portion of the compound coating optionally can be included in the protein-containing core component (e.g., 1-25%) before mixing to further enhance shelf life and improve flavor. The compound coating contains a fat source thought to coat proteins as a hydrophobic fat barrier, which retards their hydration. The compound coating also can contain a portion of the protein blend and/or other protein source. For instance, the compound coating may include about 16 to about 24 wt % protein blend as described herein. The term "fat source" as used herein is synonymous with the term "lipid." Suitable sources of the fat source include vegetable, dairy, animal and/or marine fat sources. Useful herein are fats and oils that are conventionally used in food products, particularly confections. Fatty triglycerides such as oils and solid fats can be used herein as well as blends thereof. Particularly useful oils include, for example, nonhydrogenated and/or partially hydrogenated oils such as palm kernel oil, palm oil, canola oil, corn oil, safflower oil, soybean oil, coconut oil, cottonseed oil, and fractionated oils such as fractionated palm kernel oil. Oils having a melting point above room temperature generally are more convenient to process with. However, butter, shortening, or other solid fats at room temperature also may be used, but typically will require heating sufficient to make them flowable and dispersible during processing. As dairy fat sources, anhydrous milkfat, milk concentrate, or powdered milk may be used. The fat source also includes flavoring components such as chocolate, cocoa butter, and coconut, and the like and combinations thereof. Animal (e.g., lard, beef tallow) and marine (e.g., fish oil) fat sources are generally less desired, but also may be used. Partially digestible and non-digestible synthesized triglycerides or natural lipids also optionally may be used. The compound coating generally contains about 25 to about 38 wt %, particularly about 28 to about 34 wt % total fat source content.

The compound coating also may include binders, such as those previously described herein, flavoring materials (chocolate, cocoa powder, vanilla, etc.), stabilizers (e.g., lecithin), sweeteners (e.g., natural and/or artificial sugars), inclusions, and so forth. Other additives and processing aids commonly used in confectionary compound coatings also may be used.

Optional Components and Additives. As indicated, a diverse supplemental core component, in addition to the protein-containing core component, optionally may be included in the food bar or other food product. The diverse supplemental component may comprise one or more of a caramel layer, fruit layer, creamy dairy layer, peanut butter layer, chocolate layer, frosting layer, honey layer, yogurt layer, and/or gelatin layer. It may be mono- or multi-textured. The supplemental core layer can also be made with any other suitable foods or food combinations, including any type of additive, inclusion, etc. For example, the caramel layer or component, if included, may comprise conventional caramel or similar confectionary material. For example, the caramel is comprised predominantly of a carmelized premix of carbohydrate and fat sources. Caramel may be made by mixing at least one fat source and at least one carbohydrate source to create a caramel premix. A particular caramel premix composition comprises from about 5 wt. % to about 15 wt. % of vegetable fat, more preferably, from about 7 wt. % to about 14 wt. %, and most preferably, from about 10 wt. % to about 13 wt. % of vegetable fat in the caramel premix. A preferred carbohydrate for the caramel premix is corn syrup. The corn syrup in the caramel premix is preferably present in a range of about 25 wt. % to about 60 wt. %, more preferably, from about 35 wt. % to about 50 wt. %, and most preferably, from about 40 wt. % to about 48 wt. % of corn syrup in the caramel premix. The caramel used for such applications particularly may be made from corn syrup, skim milk, sugar, partially hydrogenated cottonseed and palm oils, butter, milk protein, salt and emulsifiers.

In one embodiment, the caramel mixture is then cooked using any suitable means, e.g., using a scraped surface heat exchanger or jacketed mixing kettle, to form a caramel composition having a viscosity ranging from about 700,000 to about 1,600,000 cps, a moisture content of about 7 wt. % to about 15 wt. %, more particularly about 10 wt. % to about 13 wt. %, most particularly about 11 wt. % to about 12 wt. %, and a water activity of about 0.45 to about 0.65, more particularly about 0.5 to about 0.6, most particularly about 0.51 to about 0.58. As with conventional caramel preparation, the actual cooking time used affects the flavor, color, and texture of the caramel, and it is accordingly monitored and adjusted as needed. The caramel composition is cooled, such as to a temperature of less than about 65° C. In preparing the caramel component, the caramel composition is formed into a sheet or layer. Other portions of the caramel composition which are not sheeted or layered, may optionally be directly used as an ingredient of the protein-containing core component, and/or other ingredients or other layers of the food bar such as the enrobing composition.

Similarly, a portion of compositions used in forming a creamy dairy layer, fruit layer, and/or other supplemental core layer to be used in addition to or in lieu of the caramel layer, may optionally be used as another ingredient of the protein-containing core component and/or other layers of the food bar, such as the enrobing composition.

The core component, compound coating, and any caramel layer and/or other supplemental core component or layer, also may independently include other additives commonly used in the confectionary arts. For instance, food-flavoring additives may be added to one or more component layers of the food bar, such as, for example, salt, spices, herbs, vanilla, cocoa, chocolate, cinnamon, cheese solids, fruit particles, nuts, seeds, candies, coconut, and so forth. Other additives also may be included in one or more of the components of the food bar, such as stabilizers, preservatives, dietary fiber sources, sweeteners, nutrients, antioxidants, excipients, and so forth. Such additives may be included to the extent they do not introduce objectionable flavors or adversely impact the texture or water activity properties or processability of the bar. Generally, such additives are added at levels of less than about 5 percent of the cereal bar matrix.

For example, dairy solids may be includes in minor amounts to enhance shelf life. Dairy solids such as non-fat dry milk may be included in the cereal matrix formula in amounts of about 0.1 to about 3 wt %. Soy lecithin may be included to adjust the texture and consistency of the cereal matrix. Excipients such as calcium carbonate may be used. Preservatives may be included, such as sorbates, benzoates, etc. Natural and/or artificial sweeteners may be added.

The term "flavor" or "flavoring" as used herein refers to an organoleptic agent in the form of an emulsion, concentrate, aqueous- or oil-soluble liquid or a dry powder, as well as any type of chunky piece or pieces that may be added to a mixture at any time in the process. Flavorings can include nuts, nut pieces, fresh fruits, dried fruits, fruit products, seeds, candies, marshmallows, chocolates and chocolate products, and so forth. Nut flavorings include peanut flavorings. Flavorings further include any fruit flavors such as berry flavors, apple, cherry, plum, raisin, banana, pear, peach, figs, dates and so on. Flavorings may also include fats, salts, honeys, cheeses, frosting, powdered food products, sugar, sugar substitutes, gelatins and spices. Flavorings may also include colorings as well as any nut flavors as well as any sweet flavors such as chocolate, vanilla, peanut butter, caramel, butterscotch, lemon, malt, cinnamon, graham, coconut flavors, mint and so on. Flavorings additionally include any savory flavors such as all dairy, smoke, pepper, spicy and vegetable flavors.

Colorants include natural or uncertified colors from natural sources or certified colors for the effect of color. In one embodiment, the colors include dyes, certified aluminum lakes or colors derived from a natural source. Coloring agents may also be water-based or oil-based or dry. Coloring agents may be primary colors, blends of colors or discrete mixtures of colors, such as confetti.

The various components and layers of the food bar may include natural or artificial sweeteners to the extent they are not present in amounts that prevent conformance with caloric targets or limits set for the food bar. The sweetener may be one or more sugars. The term "sugar" as used herein refers to substantially all sugars and sugar substitutes, including any monosaccharide such as glucose or fructose, disaccharides such as lactose, sucrose or maltose, polysaccharides such as starch, oligosaccharide, sugar alcohols, or other carbohydrate forms such as gums that are starch based, vegetable based or seaweed based. The term "sweetener" as used herein refers to essentially all sweeteners that are "carbohydrate"-based, as defined herein and further includes sweeteners that are "non-nutritive" as defined above under "additive" above. Artificial sweeteners may be selected, for example, from aspartame, saccharin, sucralose, acesulfame K, and the like and combinations thereof.

Dietary fiber sources can be included in a component or multiple components of food products of the present invention. These dietary fibers may comprise, e.g., water-soluble dietary fibers selected from one or more of oligosaccharides, psyllium, beta glucan, oat bran, oat groat, pectin, carrageenan, guar, locust bean gum, gum acacia, and xanthan gum, and the like or combinations thereof. As another feature of the present invention, low levels of insoluble fiber (soy and/or oat) may be used in dough formulations of the present invention to adjust dough texture.

Other edible additives include fortification components and the like. Vitamins, minerals, antioxidants, amino acids, essential oils, herbals, and polyphenols are non-limiting examples of the fortification component. The preferred vitamins are for example, vitamin A, vitamin C, vitamin D, vitamin E, vitamin K, and their derivatives and/or pro-vitamins. Preferred vitamins also include B vitamins such as, for example, biotin, folic acid, niacin, niacinamide, pantothenate, pyridoxine hydrochloride, riboflavin, thiamin hydrochloride, and the like. The minerals may include but are not limited to bromine, calcium, chromium, copper, iodine, iron, magnesium, manganese, phosphates, phosphorus, potassium, selenium, sodium, sulfur, and zinc. Amino acids include, for example, arginine, histidine, isoleucine, leucine, lysine, methionine, phenylalanine, threonine, tryptophan, valine, alanine, aspartic acid, glutamic acid, glutamine, glycine, serine, tyrosine, creatine, and the like. Moreover, phytochemicals, sterols, lycopine, herbal supplements such as ginseng, guarana, yerba mate, and the like may be included.

Inclusions may be formulated to provide a crunchy textural feel. The inclusions have at least one physiologically functional component and may be, for example, fat-based inclusions, carbohydrate-based inclusions, protein based inclusions, and the like. The fat-based inclusions are characterized by having fat as the continuous phase. Non-limiting examples of fat-based inclusions include, chocolate, peanut butter, fat substitutes, and the like. Preferred fat-based inclusions are chocolate chips, peanut butter chips, and combinations thereof. Non-limiting examples include, whey protein, soy protein, milk protein, egg protein, peanut flour, nut meats, vegetable protein, casein, and combinations thereof. Examples of carbohydrate inclusions include, starch, sugar, gels, and combinations thereof. Moreover, the carbohydrate-based inclusions are preferably, panned inclusions, extruded gel pieces, friable carbohydrate pieces, sugar bits, extruded grain flour pieces and combinations thereof. The inclusions maybe, for example, agglomerates, capsules, compilations of ingredients, chunks, bits, drops, strands, strings, and the like. They may take on a variety of shapes, so long as the average particle size of the inclusions are from about 1 mm to about 13 mm. The preferred average particle size is from about 1 mm to about 6 mm. In addition, it is contemplated that the inclusions of the present invention may be different from one another. That is, it is not necessary that the inclusions be the same. For example, the food bar optionally may contain inclusions that are fat-based inclusions and inclusions that are carbohydrate-based inclusions.

Food Bar. The food bar of the present invention may be formulated to deliver, per 28 g serving, at least about 5 g protein, particularly at least about 7 g protein. In another particular embodiment, the food bar may be formulated such that the total saturated fat content of the food bar does not exceed about 3 g, particularly does not exceed about 2.5 g, per 28 g serving. In particular the food bar is formulated to contain less than about 20 wt %, and particularly less than about 15 wt % total sugar alcohol content in any given component and the bar as a whole. The finished food bars may be formulated to have solids levels, for example, from about 75 wt. % to about 95 wt. %, particularly, from about 85 wt. % to about 92 wt. %, based on the total weight of the food bar. Moisture content and distribution throughout the finished food bar typically will substantially equilibrate within several days after production at room temperature.

Figure 5:
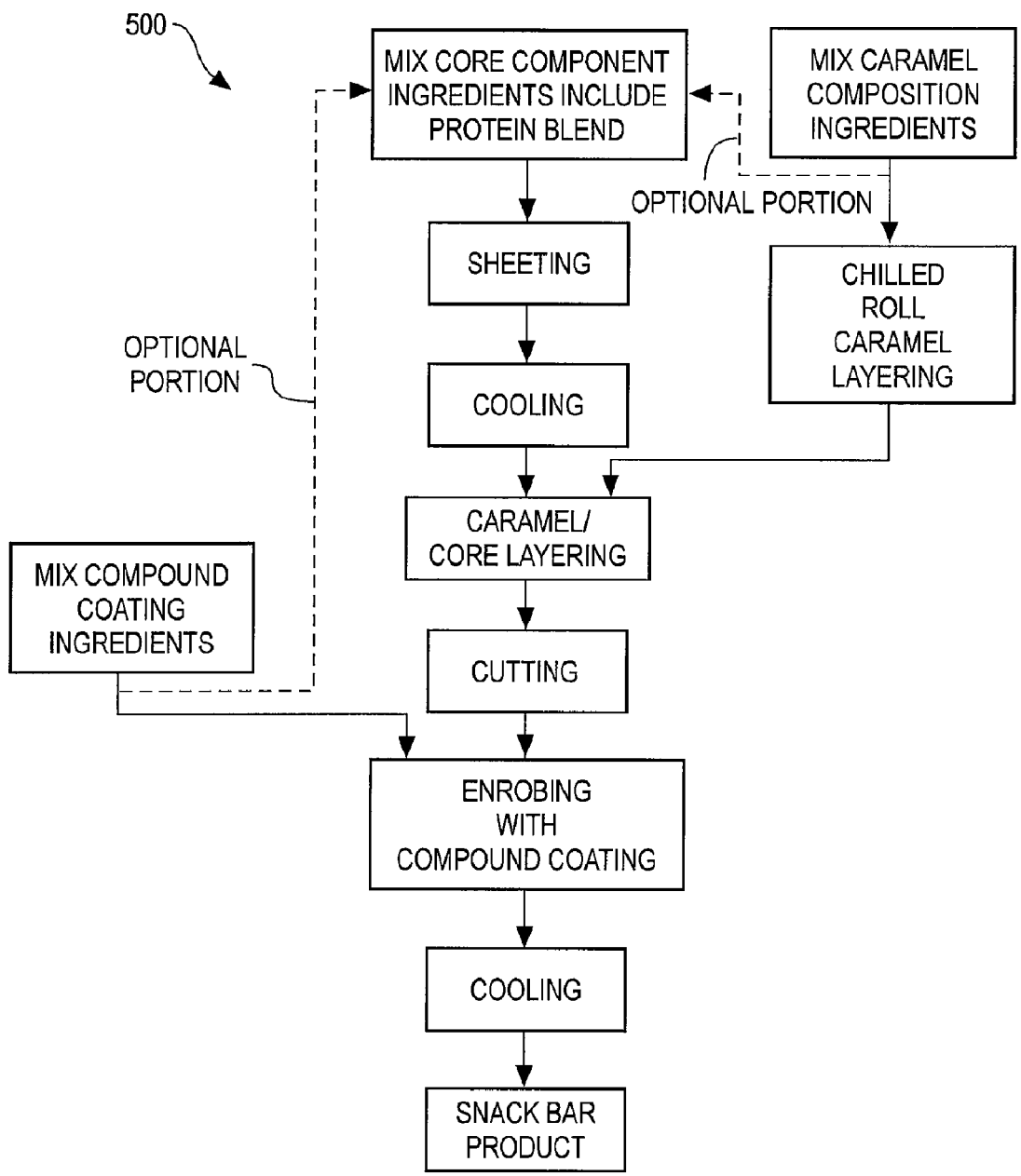
FIG. 5 provides a schematic flow diagram of a method for making a food bar according to an embodiment of the present invention.

Methods and Equipment. Referring to FIG. 5, an exemplary non-limiting method 500 is shown for making a food bar in accordance with an embodiment of the present invention.

Numerous methods and apparatus may be used to mix or combine the various components and intermediaries used to construct the protein-containing core component, caramel component, and compound coating. In general, so long as the mixing device is able to satisfactorily form a mixture that avoids high shear and imparts minimal heat energy, the mixer can be used. A sampling of such mixing devices includes but is not limited to, for example, mixing kettles and vessels, extruders, paddle mixers, ribbon blenders, mixing pans, processors, Z-blade mixers, dough mixers, planetary mixers, and the like can all be used.

Various snack bar assembly methods and apparatus may be employed to form the food bar. For example, the core component may be formed by preparing a mixture of its ingredient which is then formed into a sheet. In a particular embodiment, the sheet is formed via compression. The compression can be applied by spreading the premixed component core ingredients onto a leveled surface and applying compression from above. Any convenient suitable compression means can be used in this respect, such as by a mold, pressure platens, a compression roll or rollers, or a conveyor belt. The compression treatment will increase the density of the core component, such as to the previously indicated range values. The sheeting may be forming using compression rollers operated to create nip pressures effective for deforming the core component mixture into a substantially uniform thickness layer without significantly crushing the soy piece components thereof. Commercial bar making equipment may be used in this regard, such as Sollich bar making equipment. Individual core component pieces also may be made by employing a molding operation. A forming roll also may be used to create discrete core component pieces. An extruder also may be used to extrude the core component through a shaped die. The core component sheet is cooled. The core component sheeting, and separate caramel sheeting, may be cooled to solidify its shape or to prepare the component for the next unit operation. Typically, cooling is performed in an enclosed chamber, such as a cooling tunnel.

The caramel coating is prepared in a separate mixer. In one embodiment, it also is sheeted, which may be done in a single operation with a chilled roller, or other arrangements used in the confectionary arts for forming caramel layers. The core component is then assembled, i.e., stacked, with the caramel component, and the resulting assembly is cut into bar shapes. One method that may be used to cut the core component/caramel component multi-sheeting assembly into a discrete pieces using a cutting apparatus, for example, a slitter, guillotine, wire cutter, forming roll, extruder, stamper, molder, and the like can be used.

The cut discrete pieces of core component/caramel component assembly, are then enrobed or otherwise receive the compound coating which forms a complete or partial covering on surface portions thereof, followed by additional cooling. These series of processing steps generally can be implemented by adaptation of conventional confectionary processing techniques and equipment. The application of the compound coating may be provided in any convenient manner, such as via enrobing, drizzling, panning, extruding, spraying, depositing, and any other suitable technique may be used for applying the flowable compound coating material.

Optionally, additional processing steps may be incorporated. For example, the solid components may be treated to a roasting step to develop or impart flavor notes. This is particularly true when granola, grains, nuts, or crisps are used in the formulation. Roasting is performed in an oven such as a convection oven, a forced air impingement oven, dielectric oven, microwave oven, radiant oven, and the like. The temperature and time in the oven is largely dependent upon the component being treated. Also, while FIG. 1 shows a rectangular-shaped food bar, other geometric shapes, such as wafers in the shapes of discrete stars, circles, squares, etc., also can be made which include a bound protein blend as described herein in a core component or other layer, such as by stamping out the desired shapes from coated sheeting, or, alternatively, cross-sectional slicing extrudates formed with the desired cross-sectional shape, and so forth.

Packaging. The food bars can be packaged in any suitable manner. In one embodiment, the bars are individually wrapped such as in conventional flexible metallized film or foil known in the art and used for this general purpose. The individually wrapped food bars can be packaged in a secondary container, or a plurality of wrapped bars can be packaged in a common secondary container or carton or bag.

The examples that follow are intended to further illustrate, and not limit, embodiments in accordance with the invention. All percentages, ratios, parts, and amounts used and described herein are by weight unless indicated otherwise.

EXAMPLES

Example 1

A triple layer configuration protein bar was prepared having the ingredients and proportions thereof indicated in Table 1.

TABLE

| Ingredient | Formula % |
| --- | --- |
| Core Ingredients | |
| Partially hydrolyzed soy protein isolate | 4.1 |
| Soybean oil | 1.0 |
| Glycerin | 8.4 |
| Partially Hydrolyzed soy protein | 1.4 |
| High maltose corn syrup | 3.8 |
| High fructose corn syrup | 4.5 |
| Peanuts | 5.7 |
| Maltitol syrup | 4.5 |
| Partially Hydrolyzed whey protein isolate | 5.0 |
| Whey protein isolate | 4.5 |
| Acid casein | 6.3 |
| Calcium caseinate | 3.7 |
| Peanut butter | 1.2 |
| Peanut flour | 2.3 |
| Chocolate flavor | 0.6 |
| Vitamin/minerals | 0.8 |
| Water | 0.7 |
| Lecithin | 0.3 |
| Vanilla flavor | 0.2 |
| Butter/caramel flavor | 0.3 |
| Salt | 0.4 |
| Tocopherol | 0.02 |
| Caramel Layer Ingredients | |
| Caramel | 22.3 |
| Tricalcium Phosphate | 0.3 |
| Magnesium oxide | 0.2 |
| Compound Coating Ingredients | |
| Chocolate coating composition | 17.5 |
| Total | 100 |

Before mixing the core layer ingredients, a protein blend was prepared by combining the partially hydrolyzed soy protein isolate, partially hydrolyzed soy protein, partially hydrolyzed whey protein isolate, whey protein isolate, acid casein, and calcium caseinate.

Using the above ingredients, a protein bar was prepared in the following manner. Powders which included the protein blend, peanut flour, and vitamin/minerals were dry blended in a Hobart type mixer. Liquid binder was prepared by blending corn syrup, glycerol, maltitol, oil and flavors. The liquid binder was added to powders and blended without heat for about 2 minutes in a 5 quart Hobart type mixer, Model N-52, at approximately 60 rpm. The mixture yielded dough with a temperature of 70-80° F. The dough was sheeted out to form a uniform layer of approximately 15 mm thickness. The caramel was heated to 120° F. and blended with peanuts and applied to the protein layer to yield a 2-layer caramel coating-protein core intermediate structure. The intermediate structure was cut into discrete bars of approximately 30 mm width and approximately 87 mm length. The bars were enrobed in compound coating comprising the chocolate coating, and then cooled and packaged. Control triple layer bars were also prepared that contained no hydrolyzed protein, and instead replaced it with a comparable amount of the intact protein, but which otherwise were prepared similarly.

Over a period of 24 weeks, at 4 week intervals during storage, a random sampling of the packaged inventive and control food bars were unwrapped, and the food bars were evaluated for texture and flavor by a panel of trained experts. At eight weeks storage and thereafter, the inventive bars were qualitatively judged by all the panelists to have a moister, softer texture with better flavor than the control bars in all instances when comparisons were made.

Additional triple layer configuration food bars were prepared in the same general manner with the following variety of formulations as described in Tables 2-5. These food bars also had soft cores and fresh flavor for up to at least 20 weeks after packaging.

TABLE 2

| Ingredient | Formula % |
| --- | --- |
| Compound Coating ingredients | |
| Peanut Butter Flavored Chocolate Coating | 18.5 |
| Caramel ingredients | |
| Caramel | 19.4 |
| Magnesium Oxide 40% | 0.3 |
| Tricalcium Phosphate Anhydrous | 0.5 |
| Peanut butter | 2.9 |
| Core Ingredients | |
| Processed Water | 0.9 |
| Maltitol Syrup | 4.2 |
| High Fructose Corn Syrup, 55% | 4.3 |
| High Maltose Corn Syrup, Sweet Satin 65% | 4.8 |
| Glycerine, USP 99.7 | 7.8 |
| Oligofructose | 1.7 |
| Sugar, granular | 0.6 |
| Partially hydrolyzed Isolated Soy Protein | 2.6 |
| Isolated Soy Protein | 2.6 |
| Partially Hydrolyzed Milk Protein Isolate | 5.8 |
| Acid Casein | 7.6 |
| Whey Protein Isolate | 6.1 |
| Cocoa powder red Dutch premium alkalized | 0.7 |
| Medium Dutch Cocoa Powder | 0.9 |
| Salt | 0.4 |
| Vitamin & Mineral Premix | 0.8 |
| Canola oil | 2.5 |
| Cocoa Confectionary Wafers | 2.9 |
| Natural Sweet Chocolate Flavor | 0.6 |
| Cocoa Extract Nat. | 0.3 |
| Bleached Lecithin | 0.3 |
| Natural Vanilla Flavor | 0.1 |
| Antioxidant | 0.01 |
| Total | 100 |

TABLE 3

| Ingredient | Formula % |
| --- | --- |
| Compound Coating ingredients | |
| Milk Chocolate flavored coating | 18.3 |
| Caramel ingredients | |
| Caramel | 20.9 |
| Tricalcium Phosphate Anhydrous | 0.5 |
| Magnesium Oxide 40% | 0.3 |
| Palm Kernel Oil (Fractionated) | 0.03 |
| Cocoa Powder | 0.1 |
| Medium Dutch Cocoa Powder | 0.8 |

TABLE 3-continued

| Ingredient | Formula % |
|---|---|
| Core Ingredients | |
| Processed Water | 0.6 |
| Glycerine, USP 99.7 | 8.3 |
| Maltitol Syrup | 6.8 |
| High Fructose Corn Syrup, 55% | 2.1 |
| High Maltose Corn Syrup, Sweet Satin 65% | 3.8 |
| sugar, granular | 0.5 |
| Oligofructose | 2.2 |
| Partially Hydrolyzed Milk Protein Isolate | 5.7 |
| Acid Casein | 7.5 |
| Whey Protein Isolate | 6.0 |
| Partially Hydrolyzed Isolated Soy Protein | 2.6 |
| Isolated Soy Protein | 2.6 |
| Natural Peanut Butter | 3.5 |
| Peanut Butter Flavored Coating | 2.3 |
| Peanut Flour 12% Fat Dark, Roast | 0.7 |
| Salt | 0.4 |
| Vitamin & Mineral Premix | 0.8 |
| Peanut Oil (Extract) | 0.5 |
| Canola Oil | 1.4 |
| Bleached Lecithin | 0.2 |
| Antioxidant | 0.01 |
| Natural Peanut Flavor | 1.5 |
| Natural Vanilla Flavor | 0.2 |
| Vitamin & Mineral Premix | 0.8 |
| Total | 100 |

TABLE 4

| Ingredient | Formula % |
|---|---|
| Compound Coating ingredients | |
| Cocoa Confectionary Wafers | 18.8 |
| Caramel Ingredients | |
| Caramel | 18.9 |
| Magnesium Oxide 40% | 0.2 |
| Cocoa Powder | 0.5 |
| Medium Dutch Cocoa Powder | 1.8 |
| Tricalcium Phosphate Anhydrous | 0.4 |
| Core Ingredients | |
| Processed Water | 1.3 |
| Maltitol Syrup | 6.1 |
| High Fructose Corn Syrup, 55% | 3.5 |
| High Maltose Corn Syrup, Sweet Satin 65% | 3.9 |
| Glycerine, USP 99.7 | 7.7 |
| Oligofructose | 1.9 |
| Sugar, granular | 0.6 |
| Partially Hydrolyzed Isolated Soy Protein | 2.8 |
| Isolated Soy Protein | 2.8 |
| Partially Hydrolyzed Milk Protein Isolate | 6.2 |
| Acid Casein | 8.2 |
| Whey Protein Isolate | 6.4 |
| Cocoa powder red Dutch premium alkalized | 0.9 |
| Medium Dutch Cocoa Powder | 1.2 |
| Salt | 0.3 |
| Vitamin & Mineral Premix | 0.8 |
| Canola Oil | 3.7 |
| Cocoa Drops | 1.6 |
| Natural Sweet Chocolate Flavor | 0.6 |
| Cocoa Extract Nat. | 0.4 |
| Bleached Lecithin | 0.2 |
| Natural Vanilla Flavor | 0.2 |
| Total | 100 |

TABLE 5

| Ingredient | Formula % |
|---|---|
| Compound Coating ingredients | |
| Cocoa Confectionary Wafers | 18.2 |
| Caramel ingredients | |
| Caramel | 22.0 |
| Tricalcium Phosphate Anhydrous | 0.4 |
| Magnesium Oxide 40% | 0.2 |
| Dry Roasted Peanut Splits | 5.7 |
| Core Ingredients | |
| Processed Water | 0.56 |
| Glycerine, USP 99.7 | 8.1 |
| Maltitol Syrup | 5.5 |
| High Fructose Corn Syrup, 55% | 3.0 |
| High Maltose Corn Syrup, Sweet Satin 65% | 4.0 |
| Soy Fiber | 0.2 |
| Oligofructose | 2.0 |
| Acid Casein | 7.4 |
| Whey Protein Isolate | 5.9 |
| Partially Hydrolyzed Milk Protein Isolate | 5.6 |
| Partially Hydrolyzed Isolated Soy Protein | 2.5 |
| Isolated Soy Protein | 2.5 |
| Peanut Flour 12% Fat Dark, Roast | 0.8 |
| Peanut Butter Flavored Coating | 0.8 |
| Canola Oil | 1.0 |
| Natural Butter Caramel Flavor Enhancer | 0.3 |
| Natural Vanilla Flavor | 0.5 |
| Natural Peanut Roasted Flavor | 0.4 |
| Natural Peanut Flavor | 0.4 |
| Bleached Lecithin | 0.3 |
| Salt | 0.4 |
| Vitamin & Mineral Premix | 0.8 |
| Antioxidant | 0.02 |
| Total | 100 |

While the invention has been particularly described with specific reference to particular process and product embodiments, it will be appreciated that various alterations, modifications and adaptations may be based on the present disclosure, and are intended to be within the spirit and scope of the present invention as defined by the following claims.

What is claimed is:

1. A food product comprising a core component and a coating compound, the coating compound covering at least a portion of the core component and having a water activity of about 0.45 to about 0.65 at the time of manufacture, the core component comprising a mixture comprising a moisture source, partially hydrolyzed dairy protein, partially hydrolyzed legume protein, non-hydrolyzed intact dairy protein, and non-hydrolyzed intact legume protein, the core component balanced to provide a water activity of about 0.40 to about 0.60 at the time of manufacture, wherein the partially hydrolyzed dairy protein and partially hydrolyzed legume protein are present in a total amount effective to reduce firmness of the food product during processing and shelf life relative to an otherwise identical food product which substitutes intact forms of the partially hydrolyzed dairy protein and partially hydrolyzed legume protein therefor, and without embittering the food product, wherein the partially hydrolyzed dairy protein and partially hydrolyzed legume protein acquire moisture from the moisture source such that the partially hydrolyzed dairy protein and partially hydrolyzed legume protein hydrate during processing and shelf life without hardening, wherein the coating compound water activity and the core component water activity effect an equilibration of moisture during shelf-life and wherein the mixture provides a dough that can be formed during processing into the core component of the food product that is self supporting and remains moist and chewy during shelf life.

2. The food product of claim 1, wherein the partially hydrolyzed dairy protein comprises at least one of partially hydrolyzed whey protein and partially hydrolyzed milk protein, and the partially hydrolyzed legume protein comprises partially hydrolyzed soy protein.

3. The food product of claim 1, wherein the non-hydrolyzed intact dairy protein is selected from the group consisting of whey protein concentrate, milk protein concentrate, whey protein isolate, and milk protein isolate, and the non-hydrolyzed intact legume protein is selected from the group consisting of soy protein concentrate and soy protein isolate.

4. The food product of claim 1, wherein the partially hydrolyzed proteins and intact proteins are in powder forms having a size of minus 10% maximum on #100 U.S. sieve mesh.

5. The food product of claim 1, wherein the moisture source comprises an edible binder system.

6. The food product of claim 5, wherein the total amount of partially hydrolyzed dairy and legume protein comprises about 1 to about 40 wt % of the protein-containing component.

7. The food product of claim 1, wherein the partially hydrolyzed dairy protein and the partially hydrolyzed legume protein each have a degree of hydrolysis of about 6% to about 10%.

8. The food product of claim 1, comprising a food bar.

9. A food bar comprising a protein-containing component and a coating compound, the coating compound covering at least a portion of the protein-containing component and having a water activity of about 0.45 to about 0.65 at the time of manufacture, the protein-containing component comprising, as a unitary matrix, about 1.0 wt % to about 9 wt % partially hydrolyzed dairy protein, about 0.5 wt % to about 8.5 wt % partially hydrolyzed legume protein, about 0.5 wt % to about 8.5 wt % intact dairy protein, about 55 wt % to about 85 wt % intact legume protein, about 20 wt % to about 30 wt % acid casein or edible salt thereof, and about 20 wt % to about 40 wt % moisture-containing binder material, the protein-containing component balanced to provide a water activity of about 0.40 to about 0.60 at the time of manufacture, wherein the partially hydrolyzed dairy protein and partially hydrolyzed legume protein reduce firmness of the food bar during processing and shelf life relative to an otherwise identical food bar which substitutes intact forms of the partially hydrolyzed dairy protein and partially hydrolyzed legume protein therefor, and without embittering the food product, wherein the partially hydrolyzed dairy protein and partially hydrolyzed legume protein acquire moisture from the moisture source such that the partially hydrolyzed dairy protein and partially hydrolyzed legume protein hydrate during processing and shelf life without hardening, wherein the coating compound water activity and the protein-containing component water activity effect an equilibration of moisture during shelf-life protein-containing component, and wherein the unitary matrix provides a dough that can be formed during processing into protein-containing component of the food bar that is self supporting and remains moist and chewy during shelf life.

10. The food bar of claim 9, further comprising a caramel component contacting the protein-containing component; and a chocolate-containing composition applied to at least a portion of the protein-containing component and caramel component.

11. The food bar of claim 9, wherein the partially hydrolyzed dairy protein comprises partially hydrolyzed whey protein and/or partially hydrolyzed milk protein, and the partially hydrolyzed legume protein comprises partially hydrolyzed soy protein.

12. The food bar of claim 9, wherein the intact dairy protein is selected from the group consisting of whey protein concentrate, milk protein concentrate, whey protein isolate, and milk protein isolate, and the intact legume protein is selected from the group consisting of soy protein concentrate and soy protein isolate.

13. The food bar of claim 9, wherein the partially hydrolyzed proteins and intact proteins are in powder forms having a size of minus 10% maximum #100 U.S. sieve mesh.

14. The food bar of claim 9, wherein the binder material comprises carbohydrate syrup.

15. The food bar of claim 9, comprising a 10 to 70 g discrete shape.

16. A food product comprising a core component and a coating compound, the coating compound covering at least a portion of the core component and having a water activity of about 0.45 to about 0.65 at the time of manufacture, the core component comprising a moisture source and a protein blend the protein blend comprising:

about 5 wt % to about 30 wt % partially hydrolyzed dairy protein, about 5 wt % to about 15 wt % partially hydrolyzed legume protein, about 20 wt % to about 30 wt % intact dairy protein, about 5 wt % to about 15 wt % intact legume protein, and about 26 wt % to about 36 wt % acid casein or edible salt thereof, the core component balanced to provide a water activity of about 0.40 to about 0.60 at the time of manufacture, wherein the partially hydrolyzed dairy protein and partially hydrolyzed legume protein reduce firmness during processing and shelf life in a food product comprising the protein blend relative to an otherwise identical food product which substitutes intact forms of the partially hydrolyzed dairy protein and partially hydrolyzed legume protein therefor, and without embittering the food product, wherein the partially hydrolyzed dairy protein and partially hydrolyzed legume protein acquire moisture from a moisture source within the food product such that the partially hydrolyzed dairy protein and partially hydrolyzed legume protein hydrate during processing and shelf life without hardening, wherein the coating compound water activity and the core component water activity effect an equilibration of moisture during shelf-life, and wherein during processing the protein blend aids in forming a dough that can be formed into the core component of the food product which is self-supporting and remains moist and chewy during shelf life.

17. The protein blend of claim 16, wherein the partially hydrolyzed dairy protein comprises partially hydrolyzed whey protein and/or partially hydrolyzed milk protein, and the partially hydrolyzed legume protein comprises partially hydrolyzed soy protein.

18. The protein blend of claim 16, wherein the intact dairy protein is selected from the group consisting of whey protein concentrate, milk protein concentrate, whey protein isolate, and milk protein isolate, and the intact legume protein is selected from the group consisting of soy protein concentrate and soy protein isolate.

19. The protein blend of claim 16, wherein the partially hydrolyzed proteins and intact proteins are in powder forms having a size of minus 10% maximum on #100 U.S. sieve mesh.

20. The protein blend of claim 16, wherein the partially hydrolyzed dairy protein and the partially hydrolyzed legume protein each have a degree of hydrolysis of about 6% to about 10%.

21. The protein blend of claim 16, containing total partially hydrolyzed dairy protein and total non hydrolyzed intact dairy protein in a ratio of about 22 to about 28, respectively, and total partially hydrolyzed legume protein and total non-hydrolyzed intact legume protein in a ratio of about 22 to about 28, respectively.

22. The food product of claim 1, containing total partially hydrolyzed dairy protein and total non-hydrolyzed intact dairy protein in a ratio of about 22 to about 28, respectively, and total partially hydrolyzed legume protein and total non-hydrolyzed intact legume protein in a ratio of about 22 to about 28, respectively.

* * * * *

UNITED STATES PATENT AND TRADEMARK OFFICE
CERTIFICATE OF CORRECTION

PATENT NO. : 7,875,303 B2  
APPLICATION NO. : 11/278210  
DATED : January 25, 2011  
INVENTOR(S) : Edward C. Coleman and Gregory A. May Page 1 of 1

It is certified that error appears in the above-identified patent and that said Letters Patent is hereby corrected as shown below:

Column 19, line 57, delete "protein-containing component, and" and insert --and-- therefor.

Column 20, line 49, delete "shelf life," and insert --shelf life-- therefor.

Signed and Sealed this
Twenty-fourth Day of May, 2011

David J. Kappos
*Director of the United States Patent and Trademark Office*